US011959797B2

(12) United States Patent
Du et al.

(10) Patent No.: US 11,959,797 B2
(45) Date of Patent: Apr. 16, 2024

(54) ONLINE DETECTION DEVICE AND METHOD FOR PIEZOELECTRIC DEVICE

(71) Applicant: Beijing Taifang Technology Co., Ltd., Beijing (CN)

(72) Inventors: Chaoliang Du, Beijing (CN); Hongfeng Guo, Beijing (CN)

(73) Assignee: Beijing Taifang Technology Co., Ltd., Beijing (CN)

( * ) Notice: Subject to any disclaimer, the term of this patent is extended or adjusted under 35 U.S.C. 154(b) by 202 days.

(21) Appl. No.: 17/631,617

(22) PCT Filed: Aug. 3, 2020

(86) PCT No.: PCT/CN2020/106535
§ 371 (c)(1),
(2) Date: Jan. 31, 2022

(87) PCT Pub. No.: WO2021/031831
PCT Pub. Date: Feb. 25, 2021

(65) Prior Publication Data
US 2022/0283023 A1  Sep. 8, 2022

(30) Foreign Application Priority Data

Aug. 20, 2019  (CN) .......................... 201910770203.1
Oct. 23, 2019   (CN) .......................... 201911012641.8

(51) Int. Cl.
*G01H 11/08*     (2006.01)
*G06F 3/041*     (2006.01)

(52) U.S. Cl.
CPC ........... *G01H 11/08* (2013.01); *G06F 3/0412* (2013.01)

(58) Field of Classification Search
CPC ... G01H 11/08; G06F 3/0412; G06F 11/2221; G01D 18/00; G01L 25/00
See application file for complete search history.

(56) References Cited

U.S. PATENT DOCUMENTS 5,377,523 A       1/1995  Ohta et al.
2004/0070495 A1   4/2004  Chu et al.
(Continued)

FOREIGN PATENT DOCUMENTS

CN   201247262 Y    5/2009
CN   103415972 A   11/2013
(Continued)

OTHER PUBLICATIONS

International Search Report and Written Opinion, PCT/US2020/46570, dated Nov. 17, 2020 (10 pages).
(Continued)

*Primary Examiner* — Peter J Macchiarolo
*Assistant Examiner* — John M Royston
(74) *Attorney, Agent, or Firm* — Thomas | Horstemeyer, LLP

(57) ABSTRACT

An online detection device and method for a piezoelectric device. The device comprises an elastic wave sensor, a sell-detection circuit, a working circuit, a switch circuit and a control chip. The switch circuit is connected with the elastic wave sensor, the self-detection circuit and the working circuit. The sell-detection circuit is connected with the control chip and is used for, When being connected to the elastic wave sensor, generating, a self-detection signal according to the capacitance of the elastic wave sensor. The working circuit is connected with the control chip and is used for, when being connected to the elastic wave sensor, forming a touch detection circuit and detecting an external touch by means of the elastic wave sensor so as to obtain a detection signal. The control chip is connected with the switch circuit and is used for outputting a control signal to the switch circuit such that the elastic wave sensor is connected to the working circuit or the self-detection circuit The received self-detection signal is compared with a ref- (Continued)

erence value to obtain a self-detection result of the elastic wave sensor according to the comparison result, or obtain, according to the received detection signal, a touch pressure generated by the external touch.

17 Claims, 6 Drawing Sheets

(56) References Cited

U.S. PATENT DOCUMENTS

| | | | |
|---|---|---|---|
| 2004/0194532 A1* | 10/2004 | Lally | G01L 25/00 73/1.38 |
| 2006/0272382 A1 | 12/2006 | Pitz et al. | |
| 2007/0231304 A1 | 10/2007 | Sobol et al. | |
| 2014/0250969 A1* | 9/2014 | Alagarsamy | B81C 99/005 73/1.01 |

FOREIGN PATENT DOCUMENTS

| | | |
|---|---|---|
| CN | 103592554 A | 2/2014 |
| CN | 203688055 U | 7/2014 |
| CN | 105203146 A | 12/2015 |
| CN | 207318002 U | 5/2018 |
| CN | 108414959 A | 8/2018 |
| CN | 109444607 A | 3/2019 |
| CN | 109459651 A | 3/2019 |
| CN | 109470407 A | 3/2019 |
| CN | 109580088 A | 4/2019 |
| CN | 110045150 A | 7/2019 |
| CN | 110132458 A | 8/2019 |
| EP | 1423715 B1 | 7/2006 |
| KR | 20140002893 A | 1/2014 |
| WO | 2019/012147 A1 | 1/2019 |

OTHER PUBLICATIONS

Pham, Tuan D., et al., "Texture Analysis and Synthesis of Malignant and Benign Mediastinal Lymph Nodes in Patients with Lung Cancer on Computed Tomography," Scientific Reports, vol. 7 (2017) (10 pages).
International Search Report, PCT/CN2020/106535, dated Oct. 28, 2020 (6 pages).
First Office Action, CN Patent Application 201910770203.1, dated Jun. 11, 2021 (17 pages).
First Office Action, CN Patent Application 201911012641.8, dated Aug. 16, 2021 (20 pages).

* cited by examiner

ONLINE DETECTION DEVICE AND METHOD FOR PIEZOELECTRIC DEVICE

CROSS-REFERENCE TO RELATED APPLICATIONS

The present application is a U.S. National Phase Entry of International Application No. PCT/CN2020/106535 having an international filing date of Aug. 3, 2020, which claims the priorities to the Chinese patent application No. 201910770203.1 filed to the CNIPA on Aug. 20, 2019 and the Chinese patent application No. 201911012641,8 filed to the CNIPA on Oct. 23, 2019. The entire contents of the above-identified applications are hereby incorporated by reference.

TECHNICAL FIELD

The present invention relates to the field of electronic technologies, and more particularly, to a piezoelectric device online detection apparatus and method.

BACKGROUND

With development of electronic communication technologies, miniaturization and tightness of a device has become one of indicators considered for most electronic devices. In order to miniaturize a device, for some electronic devices, such as mobile phones, tablets, smart home appliances, etc., all or part of their operating components are integrated through touch interfaces. In these technical environments, precisions and types that can be identified by touch devices have become one of major determinants of usability and convenience of corresponding electronic devices. As for identified types of the touch devices, in addition to traditional contact position identification, contact pressure has also become a control manner that more and more electronic device suppliers need to consider. During detection of the contact pressure, an elastic wave sensor has become a cost-effective option, Based on this, from a point of view of tightness and integral firmness of a device, when an elastic wave sensor is used in an existing electronic device, the elastic wave sensor is mostly encapsulated in an internal structure of the electronic device, so as to prevent unnecessary damage to the sensor during use. However, due to nonstandard installation or other situations in an installation process of the elastic wave sensor, it is often easy to flail to achieve an expected effect during the use of the elastic wave sensor. At this time, since the electronic device has already completed encapsulation and other processes, operations such as replacement or repair of the elastic wave sensor will bring a great deal of trouble to a related staff.

In view of this situation, there is an urgent need in the industry for a detection solution and a countermeasure in which performance of an elastic wave sensor can be known without disassembling the elastic wave sensor,

SUMMARY

Embodiments of the present invention provide a piezoelectric device online detection apparatus and method, so as to implement online detection of an elastic wave sensor and overcome problems of difficult disassembly and easy damage to an elastic wave sensor during a detection process of a traditional elastic wave sensor.

An embodiment of the present invention provides a piezoelectric device online detection apparatus, according to which includes an elastic wave sensor, a self-check circuit, a working circuit, a switching circuit, and a control chip. The switching circuit: is connected to the elastic wave sensor, the elf-check circuit, and the working circuit respectively; the self-check circuit is further connected to the control chip and is configured to generate a self-check signal when connected to the elastic wave sensor; the working circuit is further connected to the control chip and is configured to form a contact detection circuit when connected to an elastic wave sensor and detect an external contact through the elastic wave sensor to obtain a detection signal; the control chip is further connected to the switching circuit and is configured to output a control signal to the switching circuit to connect the elastic wave sensor with the working circuit or the self-check circuit; and compare the received self-check signal with a reference value, and obtain a self-check result of the elastic wave sensor according to a comparison result; or obtain a contact pressure generated by the external contact according to the received detection signal.

An embodiment of the present invention further provides another piezoelectric device online detection apparatus, which includes a self-check circuit, a switching circuit, and a control chip. The switching circuit is connected to a working circuit of an external electronic device and is configured to connect a predetermined elastic wave sensor in the working circuit with the self-check circuit according to a control signal; or disconnect a connection between a predetermined elastic wave sensor and the self-check circuit; the self-check circuit is configured to generate a self-check signal according to a connected elastic wave sensor; the control chip is configured to generate and output a control signal to the switching circuit to connect the elastic wave sensor with the self-check circuit or disconnect a connection between the elastic wave sensor and the self-check circuit; and compare the received self-check signal with a reference value, and obtain a self-check result of the elastic wave sensor according to a comparison result.

An embodiment of the present invention further provides a piezoelectric device online detection method for a piezoelectric device online detection apparatus, and the method includes: connecting an elastic wave sensor with a self-cheek circuit according to a preset instruction; acquiring a self-check signal generated by the self-check circuit for the elastic wave sensor, comparing the self-check signal with a pre-stored reference value, and obtaining a self-check result of the elastic wave sensor according to a comparison result; connecting the elastic wave sensor with a working circuit according to a preset instruction to form a contact detection circuit; and detecting an external contact through the elastic wave sensor to obtain a detection signal, and calculating and obtaining a contact pressure, generated when the external contact occurs, according to the detection signal.

According to the embodiments of the present invention, a technical limitation that self-check of a traditional sensor may only be carried out in a static environment is overcome, and detection of an elastic wave sensor may be quickly completed in an application scene where the elastic wave sensor is encapsulated and fixed and is not easy to disassemble, at the same time, there is no mutual influence between a detection structure and method, and a working circuit of the elastic wave sensor. Furthermore, online self-check may be completed at any time based on the piezoelectric device online detection apparatus and method, and compensation in software is implemented according to a physical damage degree of a sensor using online self-check, thereby indirectly increasing service life of the sensor and an ability to adapt to an environment.

In an exemplary example, according to the embodiments of the present invention, whether there is any problem in a group of parallel sensors is checked first, then sensors in the group of parallel sensors are polled and detected, and the sensors in the group of parallel sensors are checked one by one to find out a damaged sensor, such that the damaged sensor may be automatically located, thereby ensuring normal use of circuits.

BRIEF DESCRIPTION OF DRAWINGS

The drawings described herein are intended to provide a further understanding of the present invention and form a part of the present application, and do not constitute a limitation to the present invention. In the drawings, related descriptions are as follows.

DETAILED DESCRIPTION

Implementations of the present invention will be described in detail below in conjunction with the drawings and embodiments, so as to fully understand and carry out an implementation process of how technical means are applied in the present invention to solve technical problems and achieve technical effects. It should be noted that as long as there is no conflict, various embodiments of the present invention and various features in the various embodiments may be combined with each other, and the formed technical solutions all fall within the protection scope of the present invention.

In addition, acts shown in flowcharts of the drawings may be performed in a computer system using a set of computer-executable instructions, and although a logical order is shown in a flowchart, the acts shown or described may be performed in an order different from that shown herein in some cases.

Figure 1:
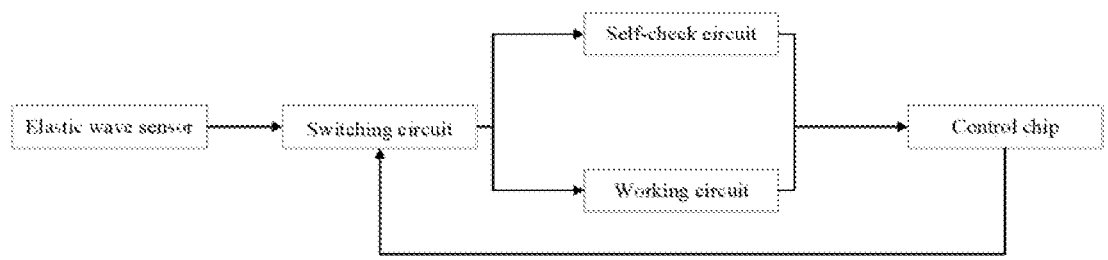
FIG. 1 is a schematic diagram of a structure of a piezoelectric device online detection apparatus according to an embodiment of the present invention.

Referring to FIG. 1, a piezoelectric device online detection apparatus according to a first embodiment of the present invention may include an elastic wave sensor, a self-check circuit, a working circuit, a switching circuit, and a control chip. The switching circuit is connected to the elastic wave sensor, the sell-cheek circuit, and the working circuit respectively.

The self-check circuit is also connected to the control chip and is configured to generate a self-check signal when connected to the elastic wave sensor.

The working circuit is also connected to the control chip and is configured to form a contact detection circuit when connected to the elastic wave sensor and detect an external contact through the elastic wave sensor to obtain a detection signal.

The control chip is also connected to the switching circuit, and is configured to output a control signal to the switching circuit so that the elastic wave sensor is connected to the working circuit or the self-check circuit; and compare the received self-check signal with a preset reference value and obtain a self-check result of the elastic wave sensor according to a comparison result; or obtain a contact pressure generated by the external contact according to the received detection signal.

In an exemplary example, the self-check circuit may be a self-excited oscillation circuit or a bridge measurement circuit. When the elastic wave sensor is connected to the self-check circuit, the self-check signal may be generated based on change in a capacitance of the elastic wave sensor. In this embodiment, the capacitance of the elastic wave sensor is associated with integrity of the elastic wave sensor, thus the change in the capacitance of the elastic wave sensor may represent change in the integrity of the elastic wave sensor. Thus, the integrity of the elastic wave sensor may be known accordingly based on a measurement result of the capacitance.

In an exemplary example, the elastic wave sensor may be a piezoelectric ceramic sensor, a piezoelectric thin film sensor, a piezoelectric crystal sensor, or another sensor with a piezoelectric effect.

In an exemplary example, the control chip may be a Microcontroller Unit (MCU) element such as a Single Chip Microcomputer, functions of which are to compare numerical values and output a preset control signal according to an external instruction. Those skilled in the art may choose to use a related processing chip with the above functions according to actual needs, which is not limited herein in the present application.

Through a structure of the piezoelectric device online detection apparatus, it is convenient for a user to conduct large-scale inspection of an electronic device using an elastic wave sensor, thereby avoiding problems such as sensor measurement distortion caused by differences in initial manufacturability in production, processes, and materials, and reducing waste of manpower and time in a traditional inspection process.

In the above embodiments, the elastic wave sensor completes self-check mainly using the self-excited oscillation circuit formed with the self-check circuit. When the elastic wave sensor is physically damaged due to an installation error or another behavior, its capacitance will decrease accordingly, at this moment the self-check signal output by the self-excited oscillation circuit is hound to change. In addition, since a square wave period output by the self-excited oscillation circuit is in a linear relationship with the capacitance of the elastic wave sensor, that is, T=KC+B, wherein T represents the square wave period of the self-check circuit, K and B are linear constants, and C represents the capacitance of the sensor, the capacitance of the elastic wave sensor may be confirmed through the square wave period output by the self-cheek circuit and the linear constants K and B obtained through testing in advance, and a condition of a damage to the elastic wave sensor may be obtained according to the capacitance of the elastic wave sensor. Of course, it may be known from a working principle of the elastic wave sensor itself that the damage to the elastic wave sensor may be divided into a slight damage and a severe damage. When the elastic wave sensor is in a slight damage, if accuracy of detection data is not considered, the elastic wave sensor may still detect a contact pressure. Therefore, in order to improve detection precision of the elastic wave sensor in a slight damage, the self-check circuit is used in the embodiment of the present invention to obtain the condition of the damage to the elastic wave sensor. Then, a calibration coefficient is obtained according, to the condition of the damage, and a detection result output by the elastic wave sensor is corrected using the calibration coefficient, thereby improving detection precision of a slightly damaged elastic wave sensor effectively. Flow to obtain the calibration coefficient according to the condition of the damage will be described in detail in subsequent embodiments of the present invention, and will not be repeated herein.

Figure 2:
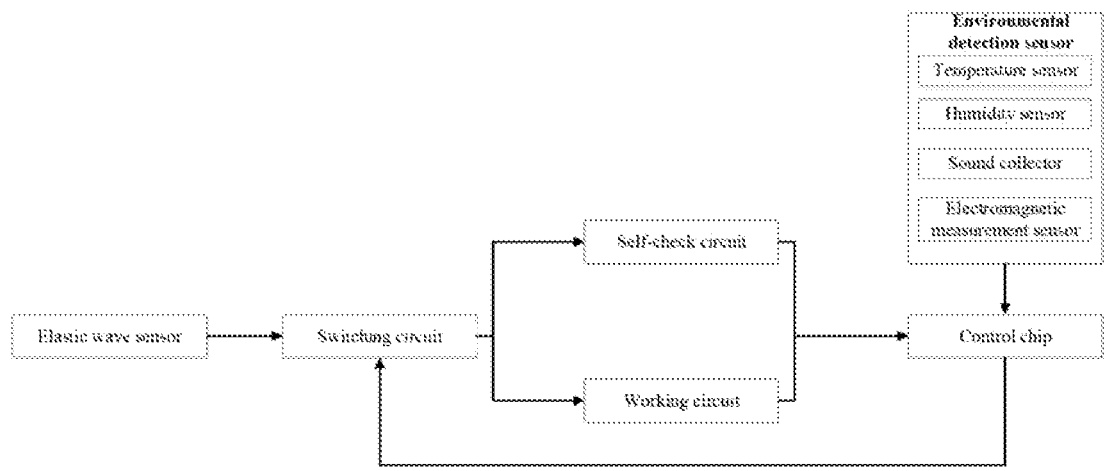
FIG. 2 is a schematic diagram of a structure of an environmental detection sensor according to an embodiment of the present invention.

Referring to FIG. 2 in view of fluctuation of detection precision due to change of an external environment during actual use, in an embodiment of the present invention, the piezoelectric device online detection apparatus according to the present invention may further include an environmental detection sensor configured to detect current environmental data and output the environmental data to the control chip.

In an exemplary example, the environmental detection sensor may include an environmental data acquisition device such as a temperature sensor, a humidity sensor, a sound collector, and an electromagnetic measurement sensor. Therefore, when a user uses the piezoelectric device online detection apparatus, accuracy of a current self-check result may be further analyzed according to environmental data collected by the environmental detection sensor. For example, when a temperature is higher or lower, a self-check result of the elastic wave sensor may be treated with different standards to prevent misjudgment and the like. The environmental data acquisition device such as the temperature sensor, the humidity sensor, the sound collector, and the electromagnetic measurement sensor may be a sensor device in related technologies, which will not be enumerated one by one. Those skilled in the art may choose and use them according to actual needs. It is worth noting that since environmental data collected by the above-mentioned environmental data collection device such as the temperature sensor, the humidity sensor, the sound collector, and the electromagnetic measurement sensor will change the detection precision of the elastic wave sensor, compensation detection may be carried out through these environmental detection sensors, and detection sensors, other detection sensor whose environmental factors are irrelevant to the detection precision of the elastic wave sensor are not included in the scope of the above-mentioned environmental detection sensors.

Further, based on the environmental data collected by the environmental detection sensor, in an embodiment of the present invention, the control chip may further include a compensation module, which is configured to compare the environmental data with a pre-stored threshold and correct the contact pressure according to a comparison result. The environmental data may include, but is not limited to, a combination of one or more of temperature data, humidity data, noise data, and electromagnetic compatibility data. Thus, a predefined compensation coefficient is obtained according to the environmental data and a preset correspondence table. For example, assuming that the temperature data in the environmental data is A and a compensation coefficient corresponding to the temperature data A in the correspondence table is B, then the contact pressure may be corrected by using a numerical value B as a compensation coefficient; or when the temperature data A is greater than a preset threshold F, temperature compensation is carried out through a numerical value A1, and when the temperature data A is less than the threshold F, temperature compensation will not be carried out. Of course, in actual work, the environmental data may include multiple data, at this time a corresponding compensation coefficient may be obtained respectively to correct a contact pressure, or the contact pressure may be corrected by means of a machine learning algorithm and the like, which will not be described in detail herein.

In the above embodiments, when the environmental detection sensor is a temperature sensor, the compensation module is configured to compare temperature data collected b the temperature sensor with a preset temperature threshold; when the temperature data is greater than or equal to the preset temperature threshold, a capacitance of an elastic wave sensor is obtained through a following formula: $C1(t)=a \times t^2 \times t+c$ ($t \geq t0$): and when the temperature data is less than the preset temperature threshold, the capacitance of the elastic wave sensor is obtained through a following formula; $C2(t)=l \times t^2+m \times t+n$ ($t<t0$), the above formulas, $C1(t)$ and $C2(t)$ are capacitances of the elastic wave sensor; t is an ambient temperature; a, b, c, l, m, and n are constants, Then, a corrected contact pressure is calculated according to a capacitance of the elastic Wave sensor, a contact pressure, and a compensation coefficient through a following compensation function. The compensation function may include: $P=P1+x-y \times z$, wherein P is the corrected contact pressure; P1 is the contact pressure obtained by the control chip according to a detection signal; t is the capacitance of the elastic wave sensor, which is $C1(t)$ or $C2(t)$; x and y are preset compensation coefficients, which are constants.

Figure 3:
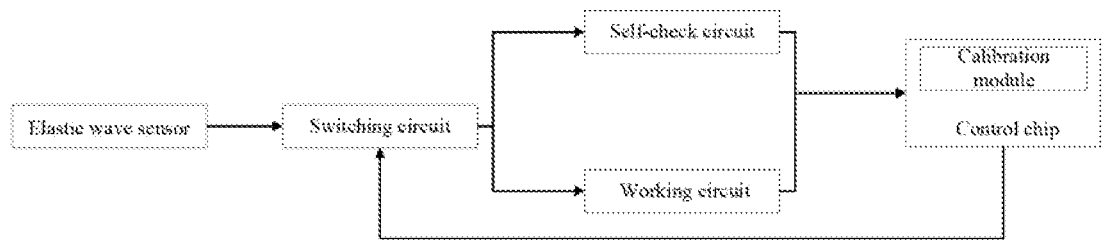
FIG. 3 is a schematic diagram of an application structure a piezoelectric device online detection apparatus according to an embodiment of the present invention.

Referring to FIG. 3, in an embodiment of the present invention, the control chip may further include a calibration module, which is configured to obtain a calibration coefficient according to a self-check result and correct the contact pressure according to the calibration coefficient. In an exemplary example, the calibration coefficient may be obtained using a traditional comparison table. For example, a corresponding relationship between a self-check result and a calibration coefficient may be obtained through previous detection, a comparison table may be established according to the corresponding relationship, and then a corresponding calibration coefficient may be obtained by comparing the self-check result with a preset comparison table in an online detection stage. Of course, calibration may be completed using a machine learning algorithm, which will not be further limited herein. Those skilled in the art may flexibly choose settings according to actual needs. In an exemplary example, in order to avoid unnecessary waste of computing resources, before the calibration coefficient is obtained according to the self-check result, the self-check result may also be compared with a preset threshold. When the self-check result is less than the preset threshold, it means that the elastic wave sensor has better detection precision and does not need to be calibrated again; or when the self-check result is greater than the preset threshold, it means that the elastic wave sensor cannot be used normally through calibration, at this time an alarm may be generated through an alarm unit. For example, there may be three types of self-check results: 1. a frequency of a self-check signal is greater than or equal to a reference value and no processing will be performed; 2. a frequency of a self-check signal is less than a reference value and greater than a damage value, compensation will be made:, 3. a frequency of a self-check signal is less than or equal to a damage value, an alarm for replacement will be generated. That is to say, in actual work, the frequency of the self-check signal may be compared with a damage frequency threshold and a reference frequency threshold, and if it is greater than the damage frequency threshold and less than the reference frequency threshold, the capacitance of the elastic wave sensor may be obtained through a subsequent formula: or a level at which the elastic wave sensor needs to be calibrated, i.e., the self-check result, is determined according to the self-check signal, and then a calibration coefficient at a corresponding calibration level is obtained for calibration according to the self-check result. A damage threshold may be taken as a boundary tier the calibration level, that is to say, when the self-check signal is higher than the damage threshold, a corresponding calibration coefficient exists, and then a calibration operation may be completed according to the calibration coefficient. Therefore, in an embodiment of the present invention, the control chip may further include an alarm unit, which is configured to generate an alarm signal when the self-check result is greater than a damage threshold, so as to inform a user to replace or repair the elastic wave sensor.

In the above embodiments, when the self-check result is that the self-check signal is less than a reference value, a capacitance of the elastic wave sensor corresponding to the self-check result is obtained through a following formula. A calibration coefficient is obtained according to the capacitance of the elastic wave sensor, and the contact pressure is corrected according to the calibration coefficient, wherein $f=\alpha+c+\beta$, f is a frequency of a self-check signal, c is the capacitance of the elastic wave sensor, $\alpha$ and $\beta$ are constants. Then, a corrected contact pressure is obtained according to the capacitance of the elastic wave sensor, the contact pressure, and the calibration coefficient through a following calibration function, which may include: $P=P1+x-y\times c$, is the corrected contact pressure, P1 is the contact pressure obtained by the control chip according to the detection signal, c is the capacitance of the elastic wave sensor, and x and y are preset calibration coefficients, which are constants.

A second embodiment of the present invention further provides a piezoelectric device online detection apparatus, which may include a self-check circuit, a switching circuit, and a control chip.

The switching circuit is connected to a working circuit of an external electronic device and is configured to connect a predetermined elastic wave sensor in the working circuit with the self-check circuit according to a control signal; or disconnect a connection between a predetermined elastic wave sensor and the self heck circuit.

The self-check circuit is configured to generate a self-check signal according to the connected elastic wave sensor. The control chip is configured to generate mid output a control signal to the switching circuit to connect the elastic wave sensor with the self-check circuit or disconnect as connection between the elastic weave sensor and the self-check circuit; and compare the received self-check signal with a reference value, and obtain a self-check result of the elastic wave sensor according to a comparison result.

In this embodiment, the piezoelectric device online detection apparatus, as a detection mechanism independent of traditional electronic devices, may be used conveniently for performing corresponding detection of the elastic wave sensor on various electronic devices.

In the above second embodiment, when the piezoelectric device online detection apparatus is applied, the electronic device may perform self-check through following acts: connecting the elastic wave sensor in the working circuit with the self-check circuit according to a preset instruction; acquiring a self-check signal generated by the self-check circuit according to a capacitance of the elastic wave sensor, comparing the self-check signal with a preset signal, obtaining a self-check result of the elastic wave sensor according to a comparison result, obtaining a calibration coefficient according to the self-check result; connecting the elastic wave sensor with the working circuit according to a preset instruction to firm a contact detection circuit; and detecting an external contact through the elastic wave sensor to obtain a detection signal, and calculating and obtaining a contact pressure, generated when the external contact occurs, according to the calibration coefficient and the detection signal.

In an embodiment of the present invention, the apparatus in the second embodiment may further include an environmental detection sensor, which is configured to detect current environmental data and output the environmental data to the control chip. Specific types of the environmental detection sensor are described in the aforementioned embodiments, and will not be explained one by one herein.

In the second embodiment, in an embodiment of the present invention, the control chip further includes a compensation module, which is configured to compare the environmental, data with a pre-stored threshold and obtain a capacitance of the elastic wave sensor according to a comparison result: $C1(t)=a\times t^2+b\times t+c$ ($t\geq 0$); when temperature data is less than a preset temperature threshold, the capacitance of the elastic wave sensor is obtained through a following formula: $C2(t)=l\times t^2+m\times t+n$ ($t<t0$). In the above formulas, C1(t) and C2(t) are capacitances of the elastic wave sensor; t is an ambient temperature; a, b, c, l, m, and n are constants.

In the second embodiment, in an embodiment of the present invention, the control chip further includes a calibration module, which is configured to obtain the capacitance of the elastic wave sensor according to the self-check result. When the self-check result is that the self-check signal is less than a reference value, the capacitance of the elastic wave sensor corresponding to the self-check result is obtained through a following formula, which include: $f=\alpha\times c+\beta$, wherein f is the self-check signal, c is the capacitance of the elastic wave sensor, and $\alpha$ and $\beta$ are constants.

Figure 4:
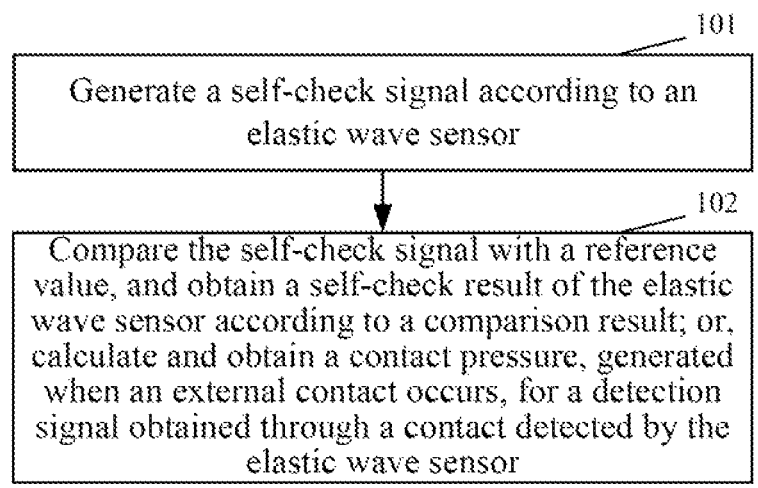
FIG. 4 is a schematic diagram of a use how of a piezoelectric device online detection apparatus according to an embodiment of the present invention.

Referring to FIG. 4, an embodiment of the present invention further provides a piezoelectric device online detection method applicable to the above-mentioned piezoelectric device online detection apparatus, the method includes following acts.

In act 101, a self-cheek signal is generated according to an elastic wave sensor.

In an exemplary, example, this act may include: connecting the elastic wave sensor with a self-check circuit according to preset instructions to form a self-excited oscillation circuit; and acquiring the self-check signal generated by the self-check circuit for the elastic wave sensor, that is to say, acquiring the self-check signal generated by the self-excited oscillation circuit according to a capacitance of the elastic wave sensor and output according to a self-excited oscillation principle.

In an exemplary example, the self-check signal includes, for example, an oscillation frequency value of the self-check signal.

In act 102, the self-check signal is compared with a reference value, and a self-check result of the elastic wave sensor is obtained according to a comparison result.

An embodiment of the present invention further provides a piezoelectric device online detection method applicable to the above-mentioned piezoelectric device online detection apparatus, the method includes: connecting an elastic wave sensor with a working circuit according to a preset instruction to form a contact detection circuit; and calculating and obtaining a contact pressure, generated when art external contact occurs, for a detection signal obtained through a contact detected by the elastic wave sensor.

In an exemplary example, the method further includes: obtaining a preset calibration coefficient according to the self-check result; the obtaining the contact pressure generated when the external contact occurs includes: calculating and obtaining the contact pressure, generated when the external contact occurs, according to the calibration coefficient and the detection signal for detecting the contact.

In an exemplary example, the calculating and obtaining the contact pressure, generated when the external contact occurs, according to the calibration coefficient and the detection signal for detecting the contact may include: connecting the elastic wave sensor with the working circuit according to the preset instruction to form the contact detection circuit; and detecting the external contact through the elastic wave sensor to obtain the detection signal, and calculating and obtaining the contact pressure, generated when the external contact occurs, according to the calibration coefficient and the detection signal.

In this embodiment, a principle of calculating and obtaining the contact pressure, generated when the external contact occurs, according to the calibration coefficient and the detection signal for detecting the contact lies in that: when an elastic wave sensor is physically damaged, a capacitance of the elastic wave sensor decreases accordingly, and a square wave period output by a detection circuit is in a linear relationship with a capacitance of a sensor, $T=KC+B$, wherein T represents the square wave period of the detection circuit; K and B are linear constants; C represents the capacitance of the sensor. Since a damage degree of a sensor is in a linear relationship with a period output by a detection circuit, when the sensor is physically damaged, it may be corrected by giving a calibration coefficient according to a period value T measured by the detection circuit. Of course, if it exceeds a range, an alarm may be output to prompt replacement of the sensor.

Figure 5:
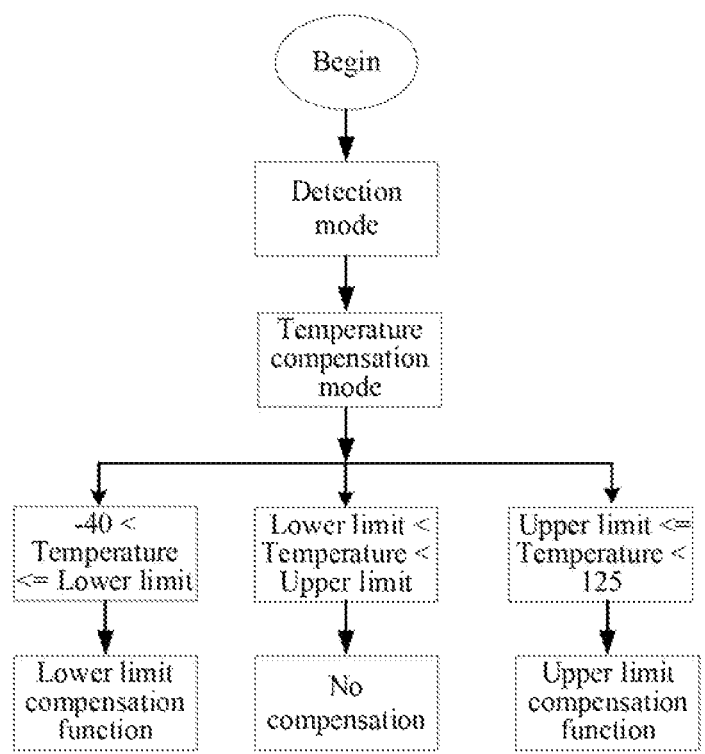
FIG. 5 is a schematic diagram of a compensation flow of a piezoelectric device online detection apparatus according to an embodiment of the present invention.

Referring to FIG. 5, in an embodiment of the present invention, the method further includes: detecting current environmental data, comparing the environmental data with a pre-stored threshold, and correcting the contact pressure according to a comparison result, wherein the environmental data may include a combination of one or more of temperature data, humidity data, noise data, and electromagnetic flux data. In an exemplary example, taking the temperature data as an example, a capacitance characteristic of the elastic wave sensor is in a corresponding functional relationship with a temperature, and a capacitance of a sensor may be compensated algorithmically according to a temperature in terms of different working environments. In an exemplary example, when the environmental data includes temperature data, the temperature data is compared with a preset temperature threshold. When the temperature data is greater than or equal to the preset temperature threshold, the capacitance of the elastic wave sensor is obtained through a following formula; a corrected contact pressure is obtained through a following compensation function according to the capacitance of the elastic wave sensor, the contact pressure, and a compensation coefficient: $C1(t)=a \times t^2+b \times t+c (t \geq t0)$. When the temperature data is less than the preset temperature threshold, the capacitance of the elastic wave sensor is obtained through a following formula: $C2(t)=l \times t^2+m \times t+n$ ($t<t0$). In the above formulas, $C1(t)$ and $C2(t)$ are capacitances of the elastic wave sensor; t is an ambient temperature; a, b, c, l, m, and n are constants. The compensation function may include: $P=P1+x-y \times z$, wherein P is the corrected contact pressure; P1 is the contact pressure obtained by a control chip according to the detection signal; z is the capacitance of the elastic wave sensor, which is $C1(t)$ or $C2(t)$: x and y are preset compensation coefficients, which are constants.

In an embodiment of the present invention, the calculating and obtaining the contact pressure, generated when the external contact occurs, according to the calibration coefficient and the detection signal may include: obtaining a capacitance of the elastic wave sensor corresponding to the self-check result through a following formula when the self-check result is that the self-check signal is less than a reference value: calculating a corrected contact pressure according to the capacitance of the elastic wave sensor, the contact pressure, and the calibration coefficient through a follow calibration function: $f=\alpha \times c+\beta$, wherein f is a frequency of the self-check signal; c is the capacitance of the elastic wave sensor: $\alpha$ and $\beta$ are constants. The calibration function may include: $P=P1+x-y \times c$, wherein P is the corrected contact pressure, P1 is the contact pressure obtained by the control chip according to the detection signal, c is the capacitance of the elastic wave sensor, and x and y are preset calibration coefficients, which are constants.

A limitation that self-check of a traditional sensor may only be carried out in a static environment is overcome in the present disclosure, and detection of an elastic wave sensor may be quickly completed in an application scene where the elastic wave sensor is encapsulated and fixed and is not easy to disassemble. At the same time, there is no mutual influence between a detection structure and method according to the present disclosure and a working circuit of the elastic wave sensor. Furthermore, online self-check may be completed in any time based on the piezoelectric device online detection apparatus and method, and compensation in software may be implemented according to a physical damage degree of a sensor using the online self-check, thereby indirectly increasing service life of the sensor and an ability to adapt to an environment.

Figure 6:
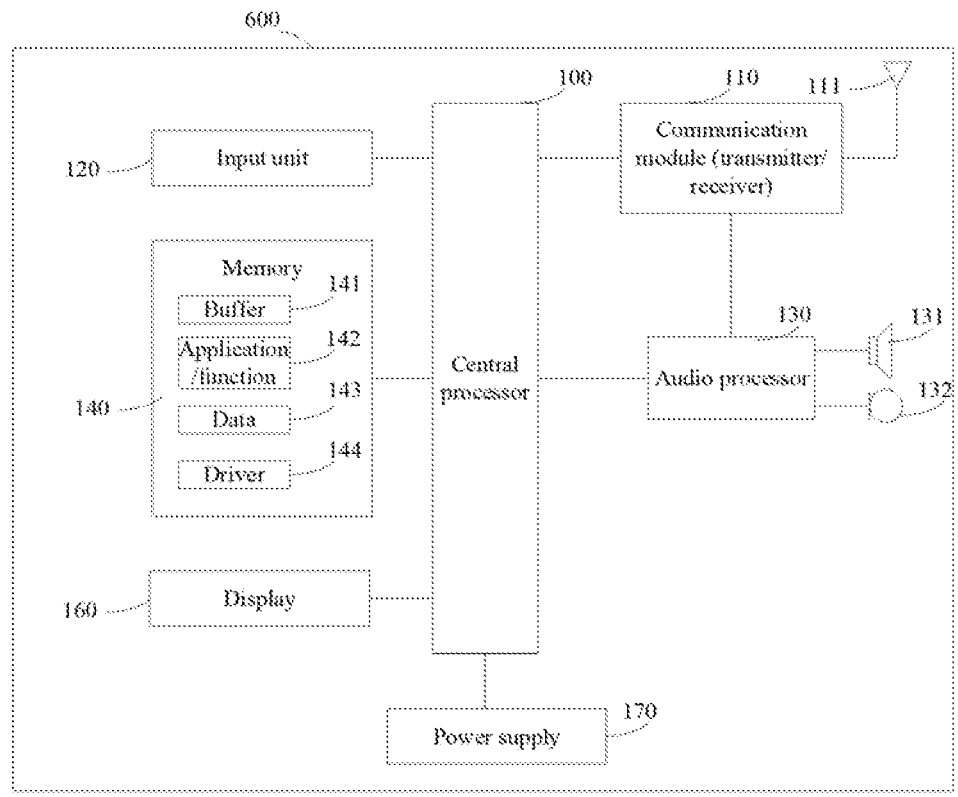
FIG. 6 is a schematic diagram of a structure of an electronic device according to an embodiment of the present invention.

As shown in FIG. 6, the electronic device 600 may further include a communication module 110, an input unit 120, an audio processing unit 130, a display 160, and a power supply 170. It is worth noting that the electronic device 600 does not necessarily include all components shown in FIG. 6. In addition, the electronic device 600 may further include components not shown in FIG. 6, and reference may be made to the prior art.

As shown in FIG. 6, a central processor 100, which is sometimes referred to as a controller or an operation control, may include a microprocessor or another processor apparatus and/or a logic apparatus. The central processor 100 receives an input and controls operations of various components of the electronic device 600.

A memory 140, for example, may be one or more of to buffer, a flash memory, a hard drive, a removable medium, a volatile memory, a non-volatile memory, or another suitable apparatus, and may store the above-mentioned information related to the failure, in addition, may further store a program for executing related information. Furthermore, the central processor 100 may execute the program stored in the memory 140 to implement information storage, processing, and etc.

The input unit 120 provides an input to the central processor 100. The input unit 120 is, for example, a key or a touch input apparatus. The power supply 170 is used for supplying power to the electronic device 600. The display 160 is used for carrying out display of display objects such as images and texts. The display may be, for example, a Liquid Crystal Display (LCD) display, but it is not: limited thereto.

The memory 140 may be a solid-state memory, such as a Read Only Memory (ROM), a Random Access Memory (RAM), a Subscriber Identity Module (SIM) card, etc. It may also be such a memory that it may save information even when power is off, and may be selectively erased and provided with more data. An example of the memory is sometimes called Electrical Programmable Read Only Memory (EPROM) or the like. The memory 140 may also be some other type of apparatus. The memory 140 includes a buffer memory 141 (sometimes called a buffer). The memory 140 may include an application/function storage part 142, which is used for storing application programs and function programs or used for executing flows of operations of the electronic device 600 through the central processor 100.

The memory 140 may also include a data storage part 143, which is used for storing data, such as contacts, digital data, pictures, sounds, and/or any other data used by an electronic device. A driver storage part 144 of the memory 140 may include various drivers of the electronic device for communication functions and/or for executing other functions (e.g., messaging application and address book application) of the electronic device.

The communication module 110 is a transmitter/receiver 110 that transmits and receives signals via an antenna 111. The communication module (transmitter/receiver) 110 is coupled to the central processor 100 to provide input signals and receive output signals, which ma be the same as a situation for a conventional mobile communication terminal.

A plurality of communication modules 110, such as a cellular network module, a Bluetooth module, and/or a wireless local area network module, may be provided in a same electronic device based on different communication technologies. The communication module (transmitter/receiver) 110 is also coupled to a speaker 131 and a microphone 132 via an audio processor 130 to provide audio outputs via the speaker 131 and receive audio inputs from the microphone 132, thereby implementing general telecommunication functions. The audio processor 130 may include any suitable buffer, decoder, amplifier, etc. In addition, the audio processor 130 is also coupled to the central processor 100, so that sounds may be recorded locally through the microphone 132, and sounds stored locally may be played through the speaker 131.

In practical application scenarios, there is a solution in which multiple elastic wave sensors are used in parallel. If any of sensors connected in parallel is damaged, the damaged sensor needs to be located for easy replacement and maintenance, so as to ensure normal use of circuits in which multiple sensors connected in parallel are located. An embodiment of the present invention further provides a piezoelectric device online detection apparatus, which is used for implementing measurement of parallel sensors to automatically locate a damaged sensor and ensure normal use of circuits.

Figure 7:
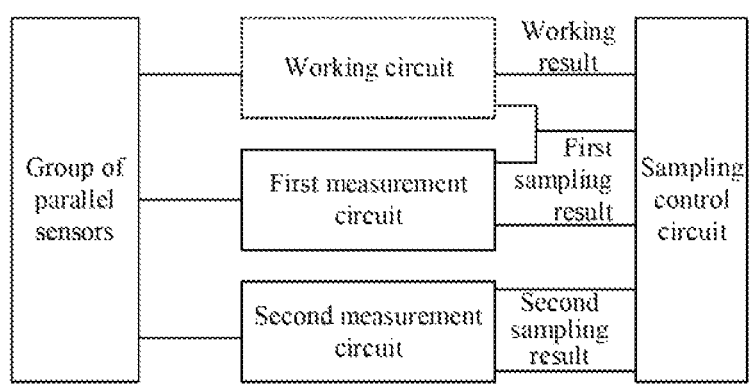
FIG. 7 is a schematic diagram of a compositional structure of a piezoelectric device online detection apparatus for implementing measurement of parallel sensors according to an embodiment of the present invention.

For such an application scenario where there are parallel sensors, that is to say, the elastic wave sensor in FIG. 1 is a group of parallel sensors including n parallel elastic wave sensors, the self-check circuit includes a first measurement circuit and a second measurement circuit, and the control chip includes a sampling control circuit, as shown in FIG. 7, which is a schematic diagram of a compositional structure of a piezoelectric device online detection apparatus for implementing measurement of parallel sensors according to an embodiment of the present invention. In the embodiment of the present invention, the piezoelectric device online detection apparatus for implementing the measurement of the parallel sensors at least includes a first measurement circuit, a second measurement circuit, a sampling control circuit, and a group of parallel sensors including n elastic wave sensors connected in parallel.

The first measurement circuit is configured to detect the group of parallel sensors under control of the sampling control circuit. In an exemplary example, the first measurement circuit is a Resistor-Capacitor (RC) circuit, which includes a first resistor and a group of parallel sensors serving as a first capacitor. The first measurement circuit detects the group of parallel sensors under control of the sampling control circuit.

The second measurement circuit is configured to poll and detect any one elastic wave sensor in the group of parallel sensors under control of the sampling control circuit. In an exemplary example, the second measurement circuit is an RC circuit which includes a second resistor, any one elastic wave sensor in the group of parallel sensors, which is serving as a second capacitor, and a switching circuit composed of switches. A switch is configured to use one elastic wave sensor in the group of parallel sensors as a second capacitor under control of the sampling, control circuit. The second measurement circuit detects each elastic wave sensor in the group of parallel sensors respectively under control of the sampling control circuit.

The sampling control circuit is configured to, when a system of an apparatus to which the sampling control circuit belongs is powered on, or according to a preset period or when a detection instruction is received, control the first measurement circuit to detect the group of parallel sensors, sample an output of the first measurement circuit, and determine whether there is a damaged elastic wave sensor in the group of parallel sensors according to a first sampling result; when there is a damaged elastic wave sensor in the group of parallel sensors, control the second measurement circuit to detect a single elastic wave sensor in the group of parallel sensors, sample an output of the second measurement circuit, and determine the damaged elastic wave sensor in the group of parallel sensors according to a second sampling result.

In an exemplary example, the elastic wave sensors include, but are not limited to, piezoelectric sensors, strain sensors, etc. The piezoelectric sensors may include piezoelectric ceramic sensors, piezoelectric thin film sensors, piezoelectric crystal sensors, or other sensors with a piezoelectric effect, etc.

In an exemplary example, the sampling control circuit is further configured to control the group of parallel sensors to connect to the working circuit during initialization or when there is no damaged sensor in the group of parallel sensors.

In an exemplary example, there is a lower limit value $C_1$ for capacitances of elastic wave sensors that form a same group of parallel sensors, and hardware replacement or other processing is performed through conversion of a filter circuit when a capacitance is less than the lower limit value.

The piezoelectric device online detection apparatus for implementing the measurement of the parallel sensors according to the embodiment of the present application first checks whether there is a problem in the group of parallel sensors, and then polls and detects sensors in the group of parallel sensors, so as to check the sensors one by one to find out a damaged sensor, such that the damaged sensor may be automatically located, thereby ensuring normal use of circuits.

In an exemplary example, the sampling control circuit may implement selection for the first measurement circuit, the second measurement circuit, and the working circuit by a switching circuit such as switches.

In an exemplary example, if there are two or more groups of parallel sensors, for detection of different groups of parallel sensors, a switching circuit may be used to achieve polling, that is, the sampling control circuit uses the switching circuit to connect each group of parallel sensors to the first measurement circuit one by one, so as to detect whether there is a damaged sensor for each group of parallel sensors respectively.

Figure 8:
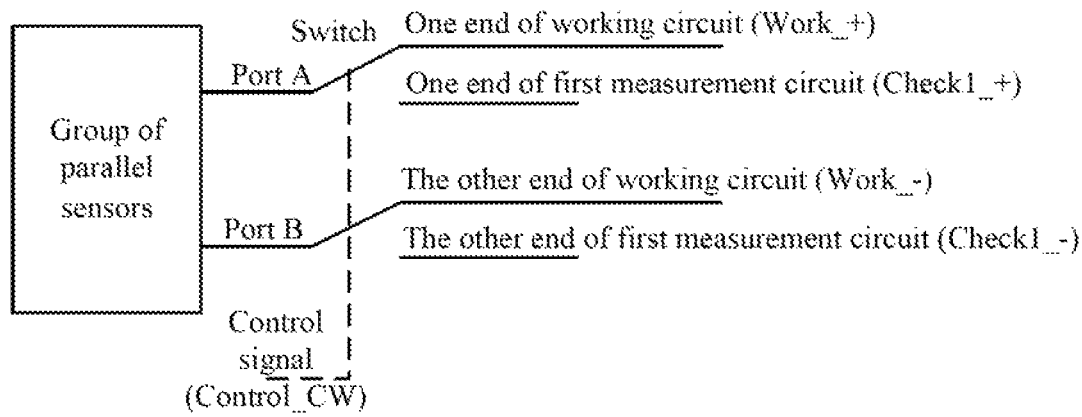
FIG. 8 is a schematic diagram of a circuit of an embodiment of switching between a first measurement circuit and a working circuit according to an embodiment of the present invention.

FIG. 8 is a schematic diagram of a circuit of an embodiment or switching between a first measurement circuit and a working circuit according to an embodiment of the present invention. As shown in FIG. 8, a group of parallel sensors is connected to the working circuit or the first measurement circuit through control of switches. In the embodiment as shown in FIG. 8, through the control of the switches, if the group of parallel sensors is connected to the working circuit, then a port A of the group of parallel sensors is connected to one end (Work_+) of the working circuit, and a port B of the group of parallel sensors is connected to the other end (Work_−) of the working circuit. Through the control of the switches, if the group of parallel sensors is connected to the first measurement circuit, then the port A of the group of parallel sensors serves as one end (Check1_+) of a first capacitor in the first measurement circuit and the port B of the group of parallel sensors serves as the other end (Check1_−) of the first capacitor in the first measurement circuit.

Figure 9:
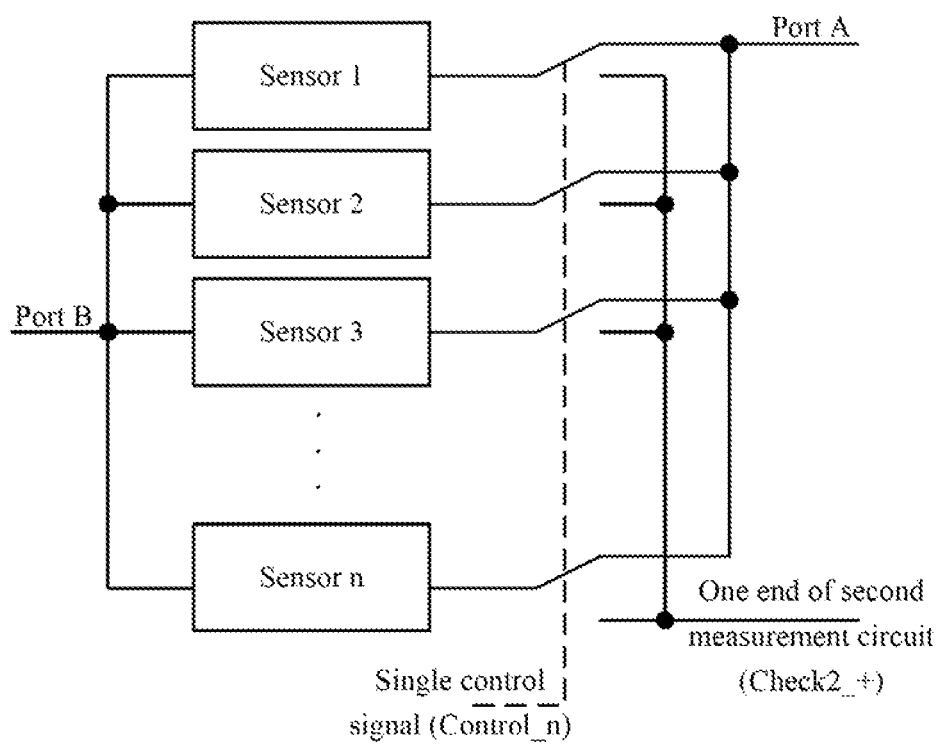
FIG. 9 is a schematic diagram of a circuit of an embodiment of a working principle of a second measurement circuit according to an embodiment of the present invention.

FIG. 9 is a schematic diagram of a circuit of an embodiment of a working principle of a second measurement circuit according to an embodiment of the present invention. As shown in FIG. 9, in this embodiment, it is assumed that a group of parallel sensors includes n elastic wave sensors, and switches include n switches that may be independently controlled. The switches shown in FIG. 9 may be internal switches of the group of parallel sensors. An elastic wave sensor in the group of parallel sensors is connected to the second measurement circuit through control of the switches, at this time, a port A of the group of parallel sensors serves as one end (Check2_+) of a second capacitor in the second measurement circuit, and a port B of the group of parallel sensors serves as the other end (Check_−) of the second capacitor in the second measurement circuit.

Figure 10:
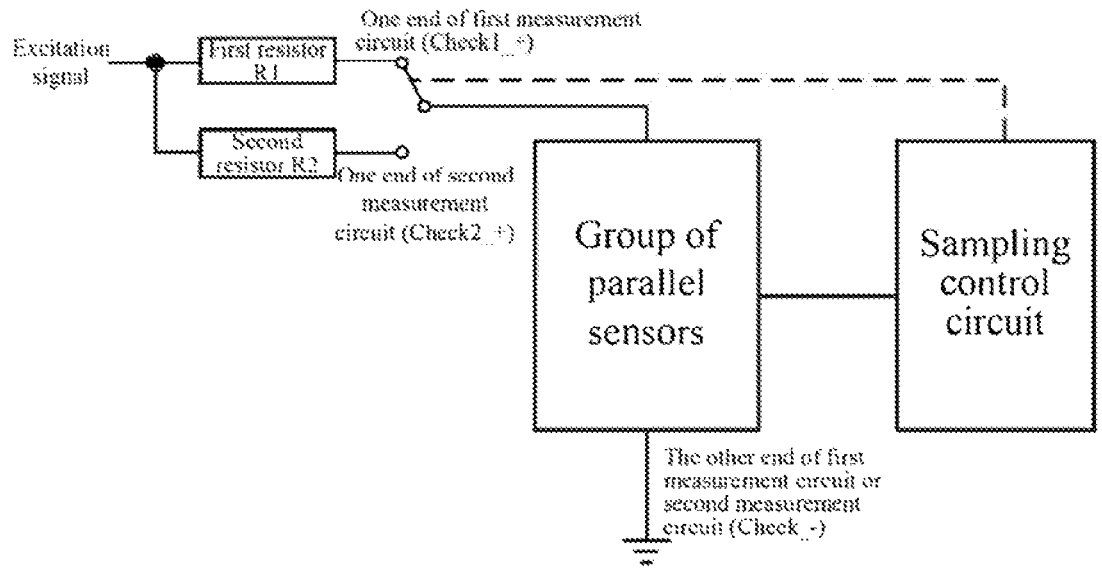
FIG. 10 is a schematic diagram of a circuit of an embodiment in which a first measurement circuit and a second measurement circuit are Resistor-Capacitance (RC) series circuits according to an embodiment of the present invention.

Taking the first measurement circuit and the second measurement circuit being an RC series circuit for example, as shown in FIG. 10, under control of a sampling control circuit, the group of parallel sensors is connected as a capacitor and becomes a part of the first measurement circuit or the second measurement circuit. In the RC circuit shown in this embodiment, a direct current can't flow through due to existence of the capacitor, and both a resistor and the capacitor hinder the current. A total impedance is determined through a resistance and a capacitive reactance and the total impedance varies with a frequency. The RC series circuit has a break frequency $f_0$: $f_0 = 1/(2\pi \times R \times C)$. When a frequency of an input signal is greater than $f_0$, a total impedance of the whole RC series circuit is basically unchanged, and its amplitude is equal to a value of a resistance.

For a case in which the group of parallel sensors is controlled to connect to the first measurement circuit and become a part of the first measurement circuit, a break frequency $f_{01} = 1/(2\pi \times R1 \times C1)$, wherein a value of a resistance R1 is a given value, its error precision is required to be less than 1%, and a compacitance C1 a sum of capacitances of various elastic wave sensors in the group of parallel sensors. When an excitation signal is given, if all elastic wave sensors in the group of parallel sensors work normally, then an amplitude of a signal obtained by the sampling control circuit and output after passing through the first measurement circuit is certain (assuming that the amplitude is a signal amplitude threshold $A_{th1}$). If there is a damaged elastic wave sensor in the group of parallel sensors, a total capacitance of the group of parallel sensors, i.e., C1 will decrease, which means that the break frequency $f_{01}$ will increase, then the amplitude of the signal obtained by the sampling control circuit and output after passing through the first measurement circuit will decrease (assuming that the amplitude is a first measured signal amplitude $A_{11}$). The sampling control circuit records the signal amplitude threshold $A_{th1}$ and the first measured signal amplitude $A_{11}$, and calculates a signal amplitude difference H between them, Here, the signal amplitude threshold $A_{th1}$ may be a value or a range.

For a case in which the group of parallel sensors is controlled to connect to the second measurement circuit and become a part of the second measurement circuit, a break frequency $f_{02} = 1/(2\pi \times R$ wherein a value of a resistance R2 is a given value, its error precision is required to be less than 1%, and a capacitance C2 is capacitances of elastic wave sensors, which are currently connected to the second measurement circuit, in the group of parallel sensors. Elastic wave sensors in the group of parallel sensors are detected one by one through switches in the group of parallel sensors shown in FIG. 10, until a sum of amplitude differences detected each time is equal to a signal amplitude difference H.

In an exemplary example, when an excitation signal is given, if an elastic wave sensor q (assuming that its capacitance is $C_{2q}$) in the group of parallel sensors, currently switched to, works normally, then an amplitude of a signal obtained by the sampling control circuit and output after passing through the second measurement circuit is certain (assuming that the amplitude is a signal amplitude threshold $A_{th2}$). If the elastic wave sensor is damaged, its capacitance, i.e., $C_{2q}$ will decrease, which means that a break frequency $f_{02}$ will increase, then the amplitude of the signal obtained by the sampling control circuit and output after passing through the second measurement circuit will decrease (assuming that the amplitude is a second measured signal amplitude $A_{2q}$). The sampling control circuit records the signal amplitude threshold $A_{th2}$ and the second measured signal amplitude $A_{2q}$ accordingly, and calculates a signal amplitude difference $H_{2q}$ between them. If $H_{2q}$ is equal to H, polling and detection by using the second measurement circuit will be stopped, and it is determined that a damaged sensor in the group of parallel sensors is the sensor q.

If $H_{2q}$ is less than H, then polling and detecting the elastic wave sensors in the group of parallel sensors continue to be performed. If an elastic wave sensor p (assuming that its capacitance is $C_{2p}$) in the group of parallel sensors, currently switched to, works normally, then the amplitude of the signal obtained by the sampling control circuit and output after passing through the second measurement circuit is certain (assuming that the amplitude is a signal amplitude threshold $A_{th2}$). If the elastic wave sensor is damaged, its capacitance i.e., $C_{2p}$ will decrease, which means that a break frequency $f_{o2}$ will increase, then the amplitude of the signal obtained by the sampling control circuit and output alter passing through the second measurement circuit will decrease (assuming that the amplitude is a second measured signal amplitude $A_{2p}$), The sampling control circuit records the signal amplitude threshold. $A_{th2}$ and the second measured signal amplitude $A_{2p}$ accordingly, and calculates a signal amplitude difference $H_{2p}$ between them. If $(H_{2p}+H_{2q})$ is equal to H, polling and detection by using the second measurement circuit will be stopped, and it is determined that damaged sensors in the group of parallel sensors are the elastic wave sensor q and the elastic wave sensor p. Here, the signal amplitude threshold $A_{th2}$ may be a value or a range.

If $(H_{2p}+H_{2q})$ is less than H, then polling and detecting the elastic wave sensors in the group of parallel sensors continue to be performed until a sum of detected signal amplitude differences is equal to H, and it is determined that a corresponding elastic wave sensor, for which a signal amplitude difference is detected, is a damaged sensor.

It should be noted that the excitation signal being given means that the excitation signal remains unchanged in the whole measurement process.

An embodiment of the present invention further provides a piezoelectric device online detection method for implementing measurement of parallel sensors, which includes: controlling a first measurement circuit to detect a group of parallel sensors, sampling an output of the first measurement circuit, and determining; whether there is a damaged elastic wave sensor in the group of parallel sensors according to a first sampling result; and controlling a second measurement circuit to detect a single sensor in the group of parallel sensors when there is a damaged elastic wave sensor in the group of parallel sensors, sampling an output of the second measurement circuit, and determining the damaged elastic wave sensor in the group of parallel sensors according to a second sampling result.

In an exemplary example, the first measurement circuit is a first Resistor-Capacitor (RC) circuit; the second measurement circuit is a second Resistor-Capacitor (RC) circuit.

The controlling the first measurement circuit to detect the group of parallel sensors includes: sampling an output of the first RC circuit by using the group of parallel sensors as a first capacitor in the first RC circuit, and detecting whether there is a damaged elastic wave sensor in the group of parallel sensors according to a first sampling result.

The controlling the second measurement circuit to detect the single sensor in the group of parallel sensors includes: polling and detecting elastic wave sensors in the group of parallel sensors by using sensors in the group of parallel sensors as a second capacitor in the second RC circuit, sampling an output of the second RC circuit respectively, and determining a damaged elastic wave sensor according to a second sampling result.

Figure 11:
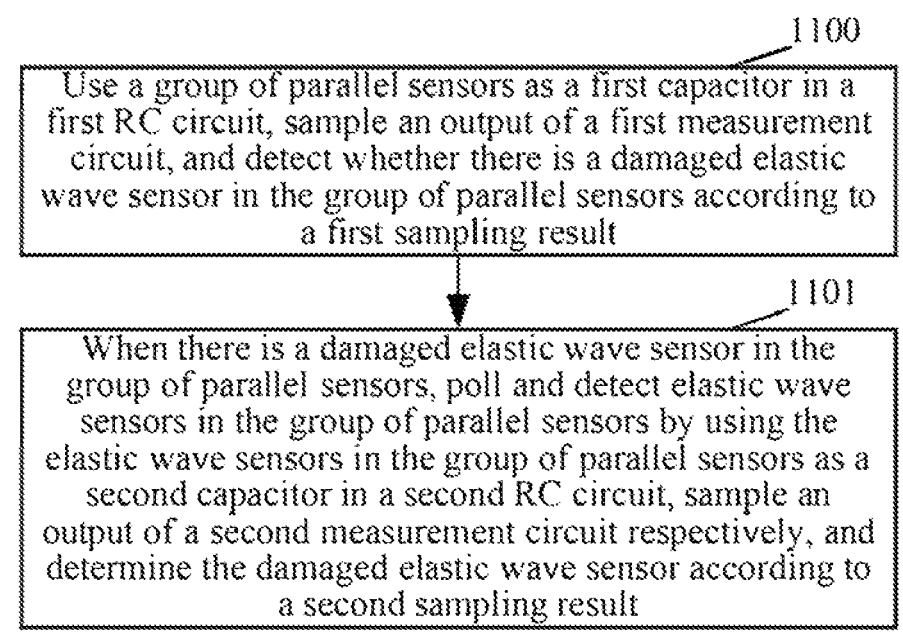
FIG. 11 is a schematic flowchart of an embodiment of implementing, measurement of parallel sensors using an RC circuit according to an embodiment of the present invention.

FIG. 11 is a schematic flowchart of an embodiment of implementing measurement of parallel sensors using an RC circuit according to an embodiment of the present invention. As shown in FIG. 11, in this embodiment, the method includes following acts.

In act 1100, a group of parallel sensors is used as a first capacitor in a first RC circuit, an output of a first measurement circuit is sampled, and whether there is a damaged elastic wave sensor in the group of parallel sensors is detected according to a first sampling result.

In an exemplary example, in this act, whether there is a damaged elastic wave sensor in the group of parallel sensors is detected, including; when an excitation signal is given, if a first measured signal amplitude $A_{11}$ shown in the first sampling result decreases relative to a signal amplitude threshold $A_{th1}$, that is to say, the first measured signal amplitude $A_{11}$ is less than the signal amplitude threshold then it is detected that there is a damaged elastic wave sensor in the group of parallel sensors; and the signal amplitude threshold $A_{th1}$ and the first measured signal amplitude $A_{11}$ are recorded, and a signal amplitude difference H between them is calculated. Here, the signal amplitude threshold $A_{th1}$ may be a value or a range.

When the excitation signal is given, if all elastic wave sensors in the parallel sensors work normally, then the first measured signal amplitude $A_{11}$ shown in the first sampling result is certain, that is, it is the signal amplitude threshold In act 1101, when there is a damaged elastic wave sensor in the group of parallel sensors, elastic wave sensors in the group of parallel sensors are polled and detected by using the elastic wave sensors in the group of parallel sensors as a second capacitor in a second RC circuit, an output of a second measurement circuit is sampled respectively, and the damaged elastic wave sensor is determined according to a second sampling result.

In an exemplary example, determining the damaged elastic wave sensor includes: when an excitation signal is given, detecting elastic wave sensors in the group of parallel sensors one by one until a sum of amplitude differences detected each time is equal to a signal amplitude difference H, and determining that a corresponding sensor, for which a signal amplitude difference is detected, is a damaged elastic wave sensor.

In an exemplary example, determining that the corresponding elastic wave sensor, for which a signal amplitude difference is detected, is the damaged elastic wave sensor specifically includes following contents.

When an excitation signal is given, an elastic wave sensor q is detected, A second measured signal amplitude $A_{2q}$ shown in the second sampling result decreases relative to a signal amplitude threshold $A_{th2}$, that is to say, if the second measured signal amplitude $A_{2q}$ shown in the second sampling result is less than the signal amplitude threshold $A_{th2}$, it is detected that the elastic wave sensor q is a damaged elastic wave sensor. A sampling control circuit records the signal amplitude threshold $A_{th2}$ and the second measured signal amplitude $A_{2q}$, and calculates a signal amplitude difference $H_{2q}$ between them. If $H_{2q}$ is equal to H, it is determined that a damaged elastic wave sensor in the group of parallel sensors is the elastic wave sensor q. Here, the signal amplitude threshold $A_{th1}$ may be a value or a range.

If $H_{2q}$ is less than H, then polling and detecting elastic wave sensors in the group of parallel sensors continue to be performed, and an elastic wave sensor p is detected. A second measured signal amplitude $A_{2p}$ shown in the second sampling result decreases relative to the signal amplitude threshold $A_{th2}$, that is to say, if the second measured signal amplitude $A_{2p}$ shown in the second sampling result is less than the signal amplitude threshold $A_{th2}$, it is detected that the elastic wave sensor p is a damaged elastic wave sensor. The sampling control circuit records the signal amplitude threshold $A_{th2}$ and the second measured signal amplitude $A_{2p}$, and calculates a signal amplitude difference $H_{2p}$ between them. If $(H_{2p}+H_{2q})$ is equal to it is determined that damaged elastic wave sensors M the group of parallel sensors are the elastic wave sensor q and the elastic wave sensor p.

If $(H_{2p}+H_{2q})$ is less than H, polling and detecting the elastic wave sensors in the group of parallel sensors continue to be performed until a sum of detected signal amplitude differences is equal to H, it is determined that a corresponding elastic wave sensor, for which a signal amplitude difference is detected, is a damaged elastic wave sensor.

When the excitation signal is given, if each elastic wave sensor i is the parallel sensors works normally, then a second measured signal amplitude $A_{2i}$ shown in the second sampling result is certain, that is, it is the signal amplitude threshold $A_{th2}$, wherein i is 1 to n, n is a quantity of elastic wave sensors in the group of parallel sensors, and p and q each are any one of the n elastic wave sensors.

In an exemplary example, during initialization or when it is detected that there is no damaged elastic wave sensor in the group of parallel sensors, the group of parallel sensors is controlled to connect to a working circuit.

In an exemplary example, if there are two or more groups of parallel sensors, different groups of parallel sensors are polled and detected according to the method from act 1100 to act 1101, that is, each group of parallel sensors is connected to a first RC circuit one by one, so as to detect respectively whether there is a damaged elastic wave sensor in each group of parallel sensors.

An embodiment of the present invention further provides a computer-readable storage medium having stored therein computer-executable instructions, which are used for executing any one of the above-mentioned piezoelectric device online detection methods.

An embodiment of the present invention further provides an electronic device, which includes a memory, a piezoelectric device online detection apparatus, a processor, and a computer program stored in the memory and runnable on the processor, wherein the processor implements any one of the above-mentioned piezoelectric device online detection methods when executing the computer program, Those skilled in the art should understand that the embodiments of the present invention ma be embodied as methods, systems, or computer program products. Accordingly, the present invention may adopt a form of an entirely hardware embodiment, an entirely software embodiment, or an embodiment combining software and hardware aspects. Furthermore, the present invention may adopt a form of a computer program product implemented on one or more computer usable storage media (including but not limited to a disk memory, a Compact Disc Read-Only Memory (CD-ROM), an optical memory, etc.) having computer usable program codes contained therein.

The embodiments of the present invention are described with reference to flowcharts and/or block diagrams of methods, devices (systems), and computer program products according to the embodiments of the present invention. It should be understood that each flow and/or block in the flow charts and/or block diagrams as well as combinations of flows and/or blocks in the flow charts and/or block diagrams may be implemented through computer program instructions. These computer program instructions may be provided to a processor of a general-purpose computer, a special-purpose computer, an embedded processing machine, or another programmable data processing device to generate a machine, so that an apparatus configured to implement functions specified in one or more flows in the flowcharts and/or one or more blocks in the block diagrams is generated through instructions executed by a processor of a computer, or another programmable data processing device.

These computer program instructions may also be stored in a computer-readable memory that may guide a computer or another programmable data processing device to work in a specific way, so that instructions stored in the computer-readable memory generate an article of manufacture including an instruction apparatus, which implement functions specified in one or more flows in the flowcharts and/or one or more blocks in the block diagrams.

These computer program instructions may also be loaded onto a computer or another programmable data processing device, so that a series of operation acts are performed on the computer or another programmable device to generate a computer-implemented processing, so that the instructions executed on the computer or another programmable device provide acts for in functions specified in one or more flows in the flowcharts and/or one or more blocks in the block diagrams.

The purposes, technical solutions, and beneficial effects of the present invention are further described in detail in conjunction with specific embodiments described above. It should be understood that what described above is only the specific embodiments of the present invention, and is not intended to limit the protection scope of the present invention. Any modification, equivalent substitution, improvement, etc. made within the spirit and principle of the present invention should be included in the protection scope of the present invention.

The invention claimed is:

1. A piezoelectric device online detection apparatus, comprising: an elastic wave sensor, a self-check circuit, a working circuit, a switching circuit, and a control chip; the switching circuit being connected to the elastic wave sensor, the self-check circuit, and the working circuit respectively; wherein
   the self-check circuit is further connected to the control chip and is configured to generate a self-check signal when connected to the elastic wave sensor;
   the working circuit is further connected to the control chip and is configured to form a contact detection circuit when connected to the elastic wave sensor and detect an external contact through the elastic wave sensor to obtain a detection signal;
   the control chip is further connected to the switching circuit and is configured to output a control signal to the switching circuit to connect the elastic wave sensor with the working circuit or the self-check circuit; and when the control signal is output to the switching circuit to connect the elastic wave sensor with the self-check circuit, the control chip is further configured to compare a received self-check signal with a reference value, and obtain a self-check result of the elastic wave sensor according to a comparison result; Of and when the control signal is output to the switching circuit to connect the elastic wave sensor with the working circuit, the control chip is further configured to obtain a contact pressure generated by the external contact according to a received detection signal.

2. The piezoelectric device online detection apparatus according to claim 1, further comprising: an environmental detection sensor configured to detect current environmental data and output the environmental data to the control chip, wherein
the control chip further comprises a compensation module configured to compare the environmental data with a pre-stored threshold and correct the contact pressure according to a comparison result.

3. The piezoelectric device online detection apparatus according to claim 2, wherein the environmental detection sensor is a temperature sensor; and
the compensation module is configured to compare temperature data collected by the temperature sensor with a preset temperature threshold; when the temperature data is greater than or equal to the preset temperature threshold, obtain a capacitance of the elastic wave sensor through a following formula: $C1(t)=a \times t^2 +b \times t+ c (t \geq t0)$; and when the temperature data is less than the preset temperature threshold, obtain a capacitance of the elastic wave sensor through a following formula: $C2(t)=l \times t^1+m \times t+n$ (t<t0), wherein C1(t) and C2(t) are capacitances of the elastic wave sensor; t is an ambient temperature; a, b, c, l, m, and n are constants.

4. The piezoelectric device online detection apparatus according to claim 3, wherein the compensation module is configured to calculate and obtain a corrected contact pressure according to the capacitance of the elastic wave sensor, the contact pressure, and a compensation coefficient through a compensation function which comprises: $P=P1+x-y \times z$, wherein P is the corrected contact pressure; P1 is the contact pressure obtained by the control chip according to the detection signal; z is the capacitance of the elastic wave sensor; x and y are preset compensation coefficients, which are constants.

5. The piezoelectric device online detection apparatus according to claim 1, wherein the control chip further comprises a calibration module which is configured to obtain a calibration coefficient according to the self-check result and correct the contact pressure according to the calibration coefficient;
when the self-check signal is less than a reference value, a capacitance of the elastic wave sensor is obtained through a following formula: $f=\alpha \times c+\beta$, wherein f is a frequency of the self-check signal, c is the capacitance of the elastic wave sensor, $\alpha$ and $\beta$ are constants; and
a corrected contact pressure is calculated and obtained according to the capacitance of the elastic wave sensor, the contact pressure, and the calibration coefficient through a calibration function which comprises: $P=P1+ x-y \times c$, wherein P is the corrected contact pressure, P1 is the contact pressure obtained by the control chip according to the detection signal, c is the capacitance of the elastic wave sensor, and x and y are preset calibration coefficients, which are constants.

6. The piezoelectric device online detection apparatus according to claim 1, wherein the elastic wave sensor is a group of parallel sensors comprising n parallel elastic wave sensors, the self-check circuit comprises a first measurement circuit and a second measurement circuit, and the control chip comprises a sampling control circuit, wherein
the first measurement circuit is configured to detect the group of parallel sensors under control of the sampling control circuit;
the second measurement circuit is configured to poll and detect any one elastic wave sensor in the group of parallel sensors under control of the sampling control circuit; and
the sampling control circuit is configured to control the first measurement circuit to detect the group of parallel sensors, sample an output of the first measurement circuit, and determine whether there is one or more damaged elastic wave sensors in the group of parallel sensors according to a first sampling result; when there is one or more damaged elastic wave sensors in the group of parallel sensors, control the second measurement circuit to detect a single sensor in the group of parallel sensors, sample an output of the second measurement circuit, and determine the one or more damaged elastic wave sensors in the group of parallel sensors according to a second sampling result; and control the group of parallel sensors to connect with the working circuit during initialization or when there is no damaged elastic wave sensor in the group of parallel sensors.

7. The piezoelectric device online detection apparatus according to claim 6, wherein
the first measurement circuit is a Resistor-Capacitor (RC) circuit comprising a first resistor and the group of parallel sensors which is used as a first capacitor;
the second measurement circuit is an RC circuit comprising a second resistor, any one sensor in the group of parallel sensors, which is used as a second capacitor, and switches, wherein a switch is configured to use one sensor in the group of parallel sensors as the second capacitor under control of the sampling control circuit.

8. The piezoelectric device online detection apparatus according to claim 6, wherein if there are two or more groups of parallel sensors, the sampling control circuit uses the switching circuit to connect each group of parallel sensors with the first measurement circuit one by one, to detect respectively whether there is one or more damaged sensors in each group of parallel sensors.

9. A piezoelectric device online detection method comprising:
connecting an elastic wave sensor with a self-check circuit according to a preset instruction;
acquiring a self-check signal generated by the self-check circuit for the elastic wave sensor, comparing the self-check signal with a pre-stored reference value, and obtaining a self-check result of the elastic wave sensor according to a comparison result;
connecting the elastic wave sensor with a working circuit according to a preset instruction to form a contact detection circuit; and
detecting an external contact through the elastic wave sensor to obtain a detection signal, calculating and obtaining a contact pressure, generated when the external contact occurs, according to the detection signal.

10. The piezoelectric device online detection method according to claim 9, wherein
the acquiring the self-check signal generated by the self-check circuit for the elastic wave sensor comprises:
acquiring the self-check signal generated by the self-check circuit according to a capacitance of the elastic wave sensor; and
obtaining a calibration coefficient according to the self-check result after the self-check result is obtained; and
the calculating and obtaining the contact pressure, generated when the external contact occurs, according to the detection signal comprises:

calculating and obtaining the contact pressure, generated when the external contact occurs, according to the calibration coefficient and the detection signal.

11. The piezoelectric device online detection method according to claim 9, further comprising: detecting current environmental data, comparing the environmental data with a pre-stored threshold, and correcting the contact pressure according to a comparison result.

12. The piezoelectric device online detection method according to claim 11, wherein the correcting the contact pressure according to the comparison result comprises:
the environmental data comprising temperature data, comparing the temperature data with a preset temperature threshold; when the temperature data is greater than or equal to the preset temperature threshold, obtaining a capacitance of the elastic wave sensor through a following formula: $C1(t)=a\times t^2+b\times t+c(t\geq t0)$; and when the temperature data is less than the preset temperature threshold, obtaining a capacitance of the elastic wave sensor through a following formula: $C2(t)=l\times t^2+m\times t+n(t<t0)$, wherein $C1(t)$ and $C2(t)$ are capacitances of the elastic wave sensor; t is an ambient temperature; a, b, c, l, m, and n are constants; and
calculating and obtaining a corrected contact pressure according to the capacitance of the elastic wave sensor, the contact pressure, and a compensation coefficient through a compensation function which comprises: $P=P1+x-y\times z$, wherein P is the corrected contact pressure; P1 is the contact pressure obtained by a control chip according to the detection signal; z is the capacitance of the elastic wave sensor; x and y are preset compensation coefficients.

13. The piezoelectric device online detection method according to claim 10, wherein the calculating and obtaining the contact pressure, generated when the external contact occurs, according to the calibration coefficient and the detection signal for detecting a contact comprises:
when the self-check signal is less than a reference value, obtaining a capacitance of the elastic wave sensor corresponding to the self-check result through a following formula: $f=\alpha\times c+\beta$, wherein f is a frequency of the self-check signal, c is the capacitance of the elastic wave sensor, $\alpha$ and $\beta$ are constants; and
calculating and obtaining a corrected contact pressure according to the capacitance of the elastic wave sensor, the contact pressure, and the calibration coefficient through a calibration function which comprises: $P=P1+x-y\times c$, wherein P is the corrected contact pressure, P1 is the contact pressure obtained by a control chip according to the detection signal, c is the capacitance of the elastic wave sensor, and x and y are preset calibration coefficients which are constants.

14. The piezoelectric device online detection method according to claim 9, wherein the elastic wave sensor is a group of parallel sensors comprising n parallel elastic wave sensors; the self-check circuit comprises a first measurement circuit and a second measurement circuit;
the acquiring the self-check signal generated by the self-check circuit for the elastic wave sensor, comparing the self-check signal with the reference value, and obtaining the self-check result of the elastic wave sensor according to the comparison result, comprises:
controlling the first measurement circuit to detect the group of parallel sensors, sampling an output of the first measurement circuit, and determining whether there is one or more damaged sensors in the group of parallel sensors according to a first sampling result; and
when there is one or more damaged sensors in the group of parallel sensors, controlling the second measurement circuit to detect a single sensor in the group of parallel sensors, sampling an output of the second measurement circuit, and determining the one or more damaged sensors in the group of parallel sensors according to a second sampling result.

15. The piezoelectric device online detection method according to claim 14, wherein the first measurement circuit is a first Resistor-Capacitor (RC) circuit; the second measurement circuit is a second Resistor-Capacitor (RC) circuit,
the controlling the first measurement circuit to detect the group of parallel sensors comprises: sampling an output of the first RC circuit by using the group of parallel sensors as a first capacitor in the first RC circuit, and detecting whether there is one or more damaged sensors in the group of parallel sensors according to a first sampling result; and
the controlling the second measurement circuit to detect the single sensor in the group of parallel sensors comprises: polling and detecting sensors in the group of parallel sensors by using the sensors in the group of parallel sensors as a second capacitor in the second RC circuit, sampling an output of the second RC circuit respectively, and determining the one or more damaged sensors according to a second sampling result.

16. The piezoelectric device online detection method according to claim 15, wherein
the detecting whether there is one or more damaged sensors in the group of parallel sensors comprises:
when an excitation signal is given, if a first measured signal amplitude $A_{11}$ shown in the first sampling result is less than a signal amplitude threshold $A_{th1}$, detecting that there is one or more damaged sensors in the group of parallel sensors; and recording the signal amplitude threshold $A_{th1}$ and the first measured signal amplitude $A_{11}$, and calculating a signal amplitude difference H between the signal amplitude threshold $A_{th1}$ and the first measured signal amplitude $A_{11}$;
wherein when the excitation signal is given, if all sensors in the parallel sensors work normally, then the first measured signal amplitude $A_{11}$ shown in the first sampling result is the signal amplitude threshold $A_{th1}$; and
the determining the one or more damaged sensors according to the second sampling result comprises: detecting the sensors in the group of parallel sensors one by one until a sum of amplitude differences detected each time is equal to the signal amplitude difference H, and determining that a corresponding sensor, for which a signal amplitude difference is detected, is a damaged sensor.

17. The piezoelectric device online detection method according to claim 15, wherein the determining that the corresponding sensor, for which the signal amplitude difference is detected, is the damaged sensor comprises:
detecting a sensor q, if a second measured signal amplitude $A_{2q}$ shown in the second sampling result is less than a signal amplitude threshold $A_{th2}$, detecting that the sensor q is a damaged sensor, recording the signal amplitude threshold $A_{th2}$ and the second measured signal amplitude $A_{2q}$, and calculating a signal amplitude difference $H_{2q}$ between the signal amplitude threshold $A_{th2}$ and the second measured signal amplitude $A_{2q}$, if $H_{2q}$ is equal to H, determining that the damaged sensor in the group of parallel sensors is the sensor q, and ending; otherwise, if $H_{2q}$ is less than H, detecting a sensor p, if a second measured signal amplitude Alp shown in the second sampling result is less than the signal amplitude threshold $A_{th2}$, detecting that the sensor p is a damaged sensor, recording the signal amplitude threshold $A_{th2}$ and the second measured signal amplitude Alp, and calculating a signal amplitude difference $H_{2p}$ between the signal amplitude threshold $A_{th2}$ and the second measured signal amplitude Alp, if $(H_{2p}+H_{2q})$ is equal to H, determining that damaged sensors in the group of parallel sensors are the sensor q and the sensor p, and ending; otherwise, if $(H_{2p}+H_{2q})$ is less than H, continuing to poll and detect the sensors in the group of parallel sensors until a sum of detected signal amplitude differences is equal to H, and determining that a corresponding sensor, for which a signal amplitude difference is detected, is a damaged sensor;

wherein when the excitation signal is given, if each sensor i in the parallel sensors works normally, then a second measured signal amplitude $A_{2i}$ shown in the second sampling result is the signal amplitude threshold $A_{th2}$, wherein i is 1 to n, n is a quantity of sensors in the group of parallel sensors, and p and q each is any one of the n sensors.

* * * * *